(12) United States Patent
Shin

(10) Patent No.: US 7,170,313 B2
(45) Date of Patent: Jan. 30, 2007

(54) APPARATUS FOR CALIBRATING TERMINATION VOLTAGE OF ON-DIE TERMINATION

(75) Inventor: Bo Hyun Shin, Kangwon-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 57 days.

(21) Appl. No.: 10/999,500

(22) Filed: Nov. 30, 2004

(65) Prior Publication Data

US 2005/0242832 A1    Nov. 3, 2005

(30) Foreign Application Priority Data

Apr. 28, 2004    (KR) ................... 10-2004-0029606

(51) Int. Cl.
*H03K 17/16*    (2006.01)
(52) U.S. Cl. .................... 326/30; 365/189.05
(58) Field of Classification Search ............ 326/30, 326/82, 83, 86; 327/108, 112; 365/189.05
See application file for complete search history.

(56) References Cited

U.S. PATENT DOCUMENTS 5,666,078 A * 9/1997 Lamphier et al. ........... 327/108
6,307,791 B1 * 10/2001 Otsuka et al. ......... 365/189.05

* cited by examiner

*Primary Examiner*—Daniel D. Chang
(74) *Attorney, Agent, or Firm*—Ladas & Parry LLP

(57) ABSTRACT

Disclosed is a device for calibrating termination voltage of an on-die termination. The device for calibrating termination voltage of an on-die termination for a semiconductor memory device having a DLL device, comprises an on-die termination enable signal generating part for outputting an ODT enable signal for driving the on-die termination (ODT) when a signal DLL Reset EMRS is applied, a counter circuit of for outputting a plurality of counter signals, an on-die termination (ODT) including a variable resistor part controlled by the counter signals outputted from the counter circuit and outputting a variable termination voltage according to a resistance value of the variable resistor part, and a first control part for comparing a reference voltage with the termination voltage and outputting a control signal for controlling the counter circuit according to a comparison result.

4 Claims, 4 Drawing Sheets

APPARATUS FOR CALIBRATING TERMINATION VOLTAGE OF ON-DIE TERMINATION

BACKGROUND OF THE INVENTION

1. Field of the Invention

The present invention relates to an apparatus for calibrating termination voltage of an on-die termination.

2. Description of the Prior Art

As generally known in the art, when pulses or signals (hereinafter, referred to as "signals") delivered through a bus line having a predetermined value of impedance meet a bus line having different impedance, some of the signals are reflected. An on-die termination (hereinafter, referred to as "ODT") means a device used for reducing the signal reflection.

As well known in the art, a semiconductor device such as a memory device exchanges data with an external system. If impedance of a bus line linking the semiconductor device with the external system is different from impedance of a signal line in the semiconductor device directly connected to the bus line, data may be reflected. Recently, in order to prevent the data reflection, an impedance matching device is usually provided to a high-speed semiconductor device. A circuit used for impedance matching is the ODT.

Recently, the ODT has been provided to a DDR2 SDRAM operating at a high speed in order to prevent signal reflection.

In an operation of the ODT, if a predetermined control signal is applied to an ODT pin from a memory controller, termination voltage Vtt of about VDDQ/2 is driven into the interior of the semiconductor device by a voltage divider of the semiconductor device. Herein, an ODT resistance value selected by EMRS is 70 ohm or 150 ohm. The resistance value may change according to semiconductor devices.

FIG. 1 is a typical circuit diagram for explaining a concept of the on-die termination.

In FIG. 1, it is preferred that termination voltage Vtt of a line ZQ is VDDQ/2. Therefore, the termination voltage is exactly VDDQ/2 only when resistance values R1 and R2 employed by voltage dividers 10 and 11, respectively, are identical to each other.

For this reason, various circuits for controlling the termination voltage are provided.

SUMMARY OF THE INVENTION

Accordingly, the present invention has been made to solve the above-mentioned problems occurring in the prior art, and an object of the present invention is to provide a circuit capable of exactly calibrating termination voltage.

Another object of the present invention is to provide a circuit capable of calibrating termination voltage by adjusting ODT impedance when generating the termination voltage through an ODT operation.

To accomplish the above objects, there is provided a device for calibrating termination voltage of an on-die termination for a semiconductor memory device having a DLL device, the device comprising an on-die termination enable signal generating part (FIG. 2) for outputting an ODT enable signal for driving the on-die termination (ODT) when a signal DLL Reset EMRS is applied, a counter circuit (FIG. 3) for outputting a plurality of counter signals, an on-die termination (FIG. 4) including a variable resistor part controlled by the counter signals outputted from the counter circuit and outputting a variable termination voltage according to a resistance value of the variable resistor part, and a first control part (FIG. 5) for comparing a reference voltage with the termination voltage and outputting a control signal for controlling the counter circuit according to a comparison result.

According to the present invention, the counter signals outputted from the counter circuits are initially set values when a voltage is applied to the semiconductor device, the counter circuit controlled in the first control part re-adjusts a resistance value of the variable resistor part in such a manner that the termination voltage is lower than the reference voltage if the termination voltage compared in the first control part is higher than the reference voltage, and the counter circuit controlled in the first control part re-adjusts the resistance value of the variable resistor part in such a manner that the termination voltage is higher than the reference voltage if the termination voltage compared in the first control part is lower than the reference voltage.

According to the present invention, the device further comprising a second control part for controlling an operation of the first control part, wherein the second control part outputs a detection signal for detecting a time point at which the termination voltage at a level higher than that of the reference voltage is first time lowered below the reference voltage or a time point at which the termination voltage at a level lower than that of the reference voltage first time elevates above the reference voltage, and the counter signal of the counter circuit controlled by the first control part fixes the termination voltage such that a just previous counter signal is maintained when the detection signal of the second control part is enabled.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
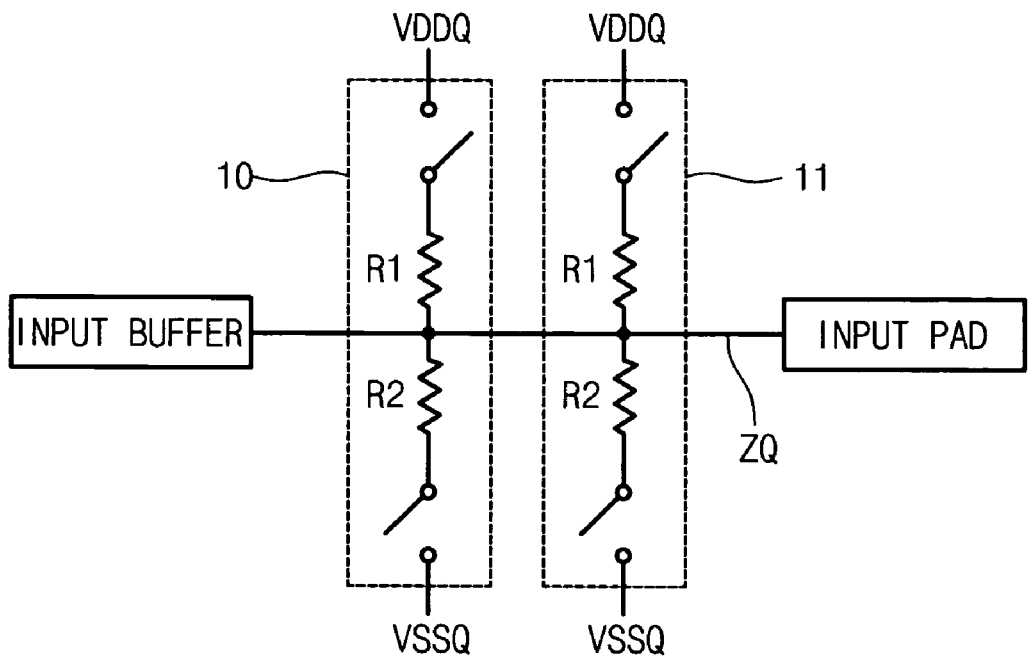
FIG. 1 is a typical circuit diagram explaining a concept of an ODT apparatus.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
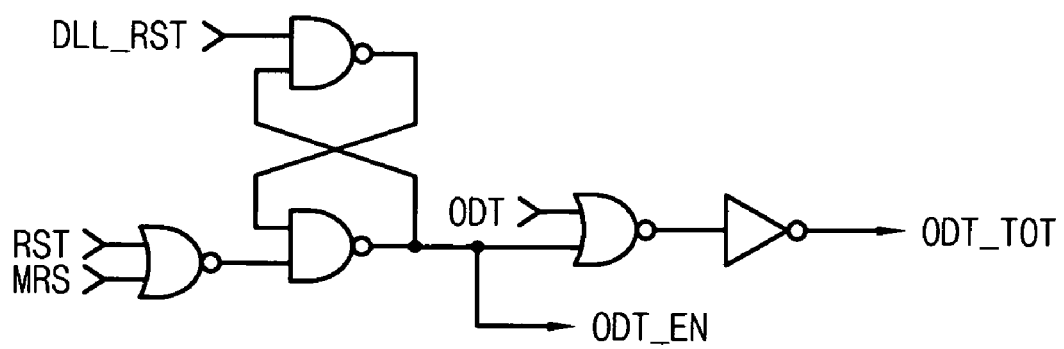
FIG. 2 is a circuit diagram showing an example of a control signal generator according to one embodiment of the present invention.

FIG. 2 is a circuit diagram showing an example of a control signal generator according to one embodiment of the present invention.

In FIG. 2, RST denotes a signal enabled at a high level when power is initially applied to a semiconductor device. DLL_RST denotes a signal enabled when a signal DLL Reset EMRS is applied. MRS denotes a signal applied after the signal DLL Reset EMRS and disabling an enabled signal ODT. Herein, the signal ODT is applied from an external device. In detail, the signal ODT is applied after performing an ODT function through an internal operation of the control signal generator.

In an operation of the control signal generator, the DLL Reset EMRS is applied during an operation of the DDR2 SDRAM. The control signal generator internally generates a signal ODT_EN being an enable signal of the signal ODT by receiving the signal DLL Reset EMRS, and disables the signal ODT_EN by using the signal MRS applied after the signal DLL Reset EMRS.

Figure 3:
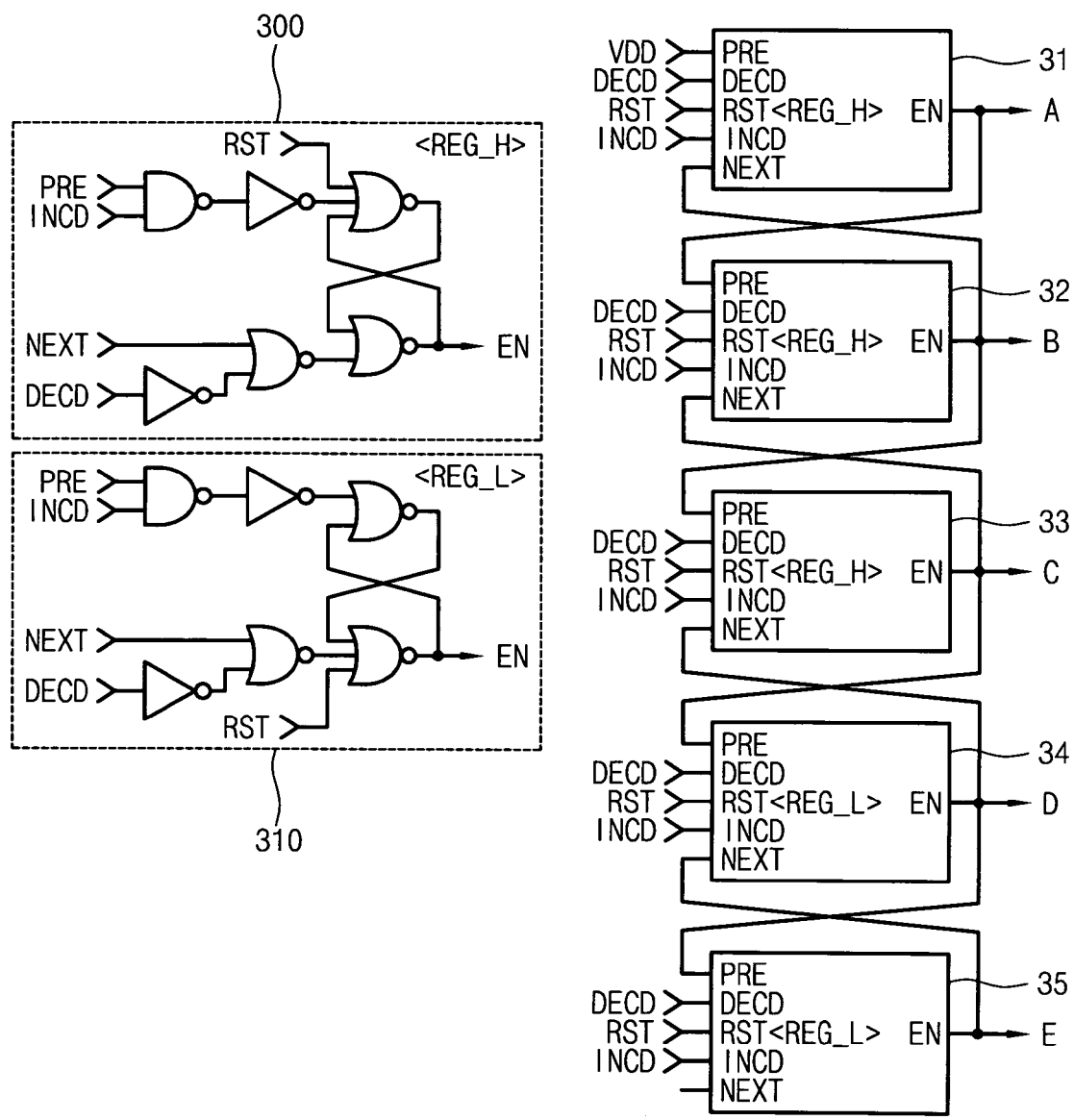
FIG. 3 is a view showing a counter for controlling a turn-on/off state of a resistor of an ODT apparatus.

FIG. 3 is a circuit diagram showing a counter part for controlling a turn-on/off state of a resistor of the ODT device.

In FIG. 3, a counter part 31, 32, and 33 has the same structure as a counter part 300, and a counter part 34 and 35 have the same structure as a counter part 310.

Figure 4:
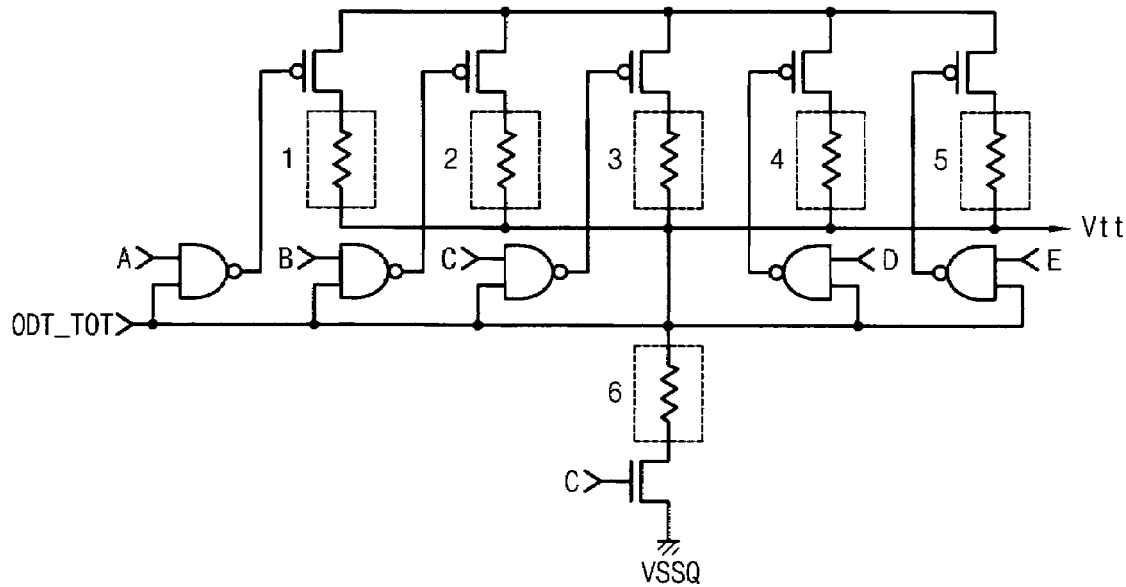
FIG. 4 is a circuit diagram showing an ODT device for generating termination voltage.

Output signals A to E of the counter part 31 to 35 calibrates the termination voltage Vtt by controlling transistors shown in FIG. 4.

FIG. 4 is a circuit diagram showing the ODT device in order to explain generation of the termination voltage.

From FIG. 4, it can be understood that the termination voltage Vtt can be calibrated by means of PMOS transistors selectively turned-on.

Figure 5:
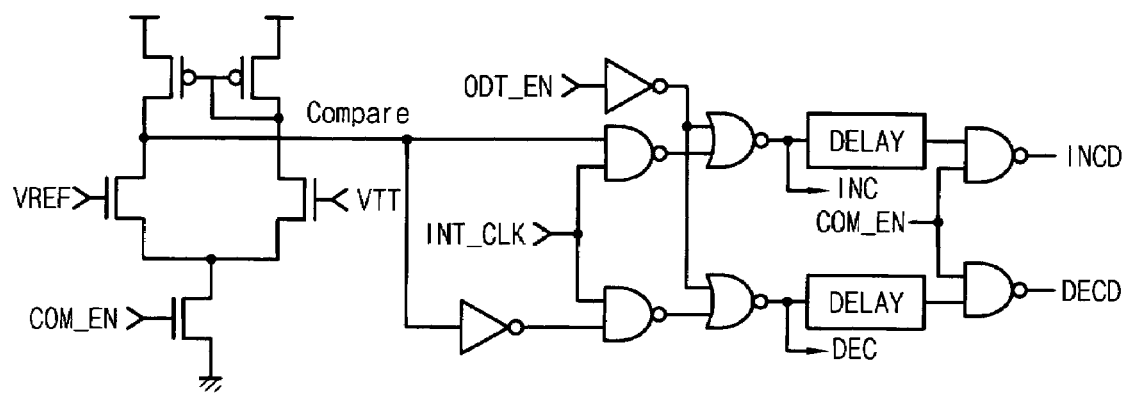
FIG. 5 is a circuit diagram showing generation of a control signal for calibrating the termination voltage.

FIG. 5 is a circuit diagram showing generation of a control signal for calibrating the termination voltage. In other words, output signals of a circuit shown in FIG. 5 are applied to the circuit shown in FIG. 3 so as to control the operation of the circuit shown in FIG. 3. As a result of the control of the circuit operation shown in FIG. 3, the termination voltage can be calibrated as shown in FIG. 4.

Figure 6:
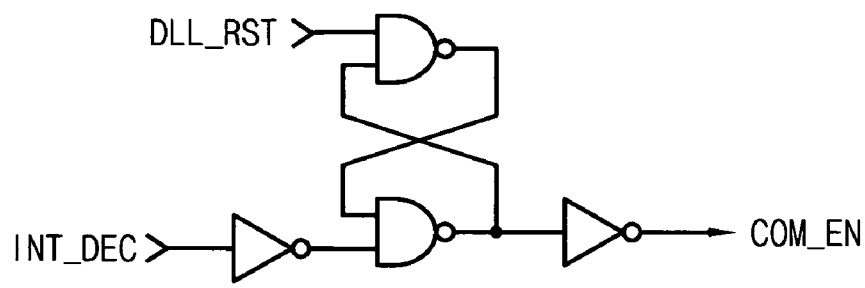
FIG. 6 illustrates a circuit for controlling an operation of the circuit shown in FIG. 5.

FIG. 6 illustrates a circuit for controlling an operation of the circuit shown in FIG. 5.

As shown in FIG. 6, if an output signal COM_EN shown in FIG. 6 has a high level, the output signals INCD and DECD shown in FIG. 5 are disabled at a low level.

Hereinafter, an operation of the device for calibrating the termination voltage according to the present invention will be described with reference to FIG. 2 to FIG. 6.

For example, in FIG. 3, if all output signals A to C of the counter part 31 to 33 are initially set at high levels and all output signals D to E of the counter part 34 to 35 are initially set at low levels, the resistors 1, 2, 3, and 6 shown in FIG. 4 are connected to the voltage VDDQ and the resistors 4 and 5 are not connected to the voltage VDDQ. Accordingly, the termination voltage shown in FIG. 4 can be calibrated by adjusting logical levels of the output signals shown in FIG. 3.

A reference voltage VREF shown in FIG. 5 is a voltage applied from an external memory controller and has the voltage level of VDDQ/2. The reference voltage VREF is compared with the initially set termination voltage Vtt by means of the signal ODT_EN.

First, if the termination voltage Vtt is higher than the reference voltage VREF, an output signal Compare of a comparator shown in FIG. 5 has a high level. At this time, the increase signal INCD is generated for every clock due to an internal clock INT_CLK generated from the interior of the semiconductor device.

Next, if the termination voltage Vtt is lower than the reference voltage VREF, the output signal Compare of the comparator shown in FIG. 5 has a low level. At this time, the decrease signal DECE is generated for every clock due to the internal clock INT_CLK generated from the interior of the semiconductor device.

For example, if the termination voltage Vtt is higher than the reference voltage VREF, the circuit shown in FIG. 3 is controlled due to the increase signal INCD generated for every clock (refer to that, in this case, the signal INC shown in FIG. 5 has a high level). That is, the output signal D of the counter 34, which has been initially set at a low level, has a high level. Accordingly, the PMOS transistor connected to the resistor 4 shown in FIG. 4 is turned on. Thus, the voltage level of the termination voltage Vtt is lowered. At this time, the termination voltage Vtt having the lowered voltage level is compared with the reference voltage VREF in the comparator shown in FIG. 5. If the termination voltage Vtt is higher than the reference voltage VREF, the output signal Compare of the comparator has a high level. At this time, the output signal level of the counter 35 shown in FIG. 3 is changed to a high level from a low level, which is set at the first stage, due to the increase signal INCD generated by the internal clock signal INT_CLK (refer to that, in this case, the signal INC shown in FIG. 5 has a high level). AS a result, the PMOS transistor connected to the resistor 5 shown in FIG. 4 is turned on. Thus, the voltage level of the termination voltage Vtt is lowered. The lowered termination voltage Vtt is compared with the reference value VREF in the comparator shown in FIG. 5. If the termination voltage Vtt is lower than the reference value VREF, the output signal Compare of the comparator has a low level. Thus, the signal DEC shown in FIG. 5 has a high level. A signal INC_DEC shown in FIG. 6 is enabled at a high level only when the signal DEC is enabled after the signal INC shown in FIG. 5 is enabled, or the signal INC is enabled after the signal DEC is enabled. That is, the signal INC_DEC shown in FIG. 6 is enabled when detecting a time point at which the termination voltage Vtt at a level higher than that of the reference voltage VREF is lowered first time below the reference voltage or a time point at which the termination voltage Vtt at a level lower than that of the reference voltage VREF elevates first time above the reference voltage. Accordingly, when the logical level of the signal INC_DEC is a high level, the output signal COM_EN shown in FIG. 6 has a low level. Thus, all output signals INCD and DECD shown in FIG. 5 have high levels. Accordingly, the output signals of the counter part shown in FIG. 3 maintain just previous logical levels.

Figure 7:
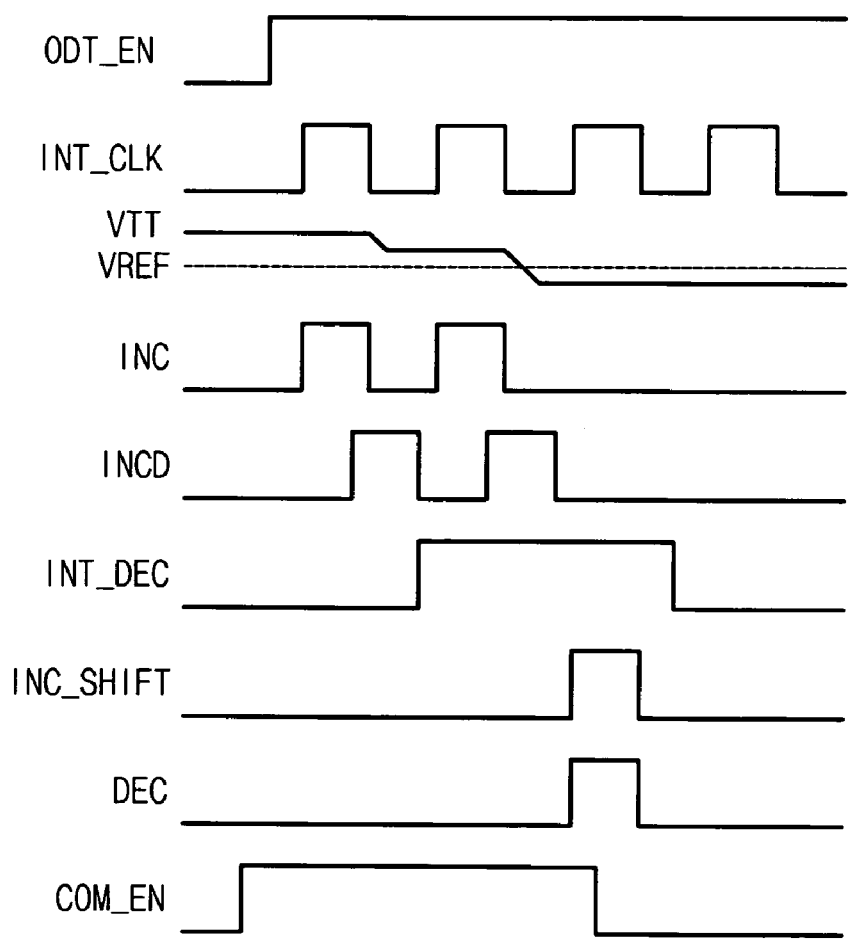
FIG. 7 is a signal timing chart according to the present invention.

FIG. 7 is a signal timing chart according to the present invention described above.

In FIG. 7, a signal INC_SHIFT is a logical level signal generated in synchronization with the signal INC. The signal INC_DEC represents a signal generated through 'AND' operation between the signal DEC and the signal INC_SHIFT.

As described above, according to the present invention, since the optimum termination voltage can be previously set by the signal DLL Reset EMRS before the ODT signal is applied in the memory controller.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for calibrating termination voltage of an on-die termination for a semiconductor memory device having a DLL circuit, the apparatus comprising:
the DLL circuit receiving a DLL RST input signal, which is enabled when a predetermined signal including a signal DLL Reset EMRS is applied;
an on-die termination enable signal generating part for outputting an ODT enable signal for driving the on-die termination (ODT) when the signal DLL Reset EMRS is applied;
a counter circuit for outputting a plurality of counter signals;
an on-die termination (ODT) part including a variable resistor part controlled by the counter signals outputted from the counter circuit and outputting a variable termination voltage according to a resistance value of the variable resistor part; and
a first control part for comparing a reference voltage with the termination voltage and outputting a control signal for controlling the counter circuit according to a comparison result.

2. The apparatus as claimed in claim 1, wherein the counter signals outputted from the counter circuit are initially set values when a voltage is applied to the semiconductor device, the counter circuit controlled in the first control part re-adjusts a resistance value of the variable resistor part in such a manner that the termination voltage is lower than the reference voltage if the termination voltage compared in the first control part is higher than the reference voltage, and the counter circuit controlled in the first control part re-adjusts the resistance value of the variable resistor part in such a manner that the termination voltage is higher man the reference voltage if the termination voltage compared in the first control part is lower than the reference voltage.

3. The apparatus as claimed in claim 2, further comprising a second control part for controlling an operation of the first control part, wherein the second control part outputs a detection signal for detecting a time point at which the termination voltage at a level higher than that of the reference voltage is first time lowered below the reference voltage or a time point at which the termination voltage at a level lower than that of the reference voltage first time elevates above the reference voltage, and the counter signal of the counter circuit controlled by the first control part fixes the termination voltage such that a just previous counter signal is maintained when the detection signal of the second control part is enabled.

4. The apparatus as claimed in claim 2, wherein the ODT enable signal generating part -receives a signal MRS disabling the ODT enable signal.

* * * * *